(12) United States Patent
Pfeiffer et al.

(10) Patent No.: US 10,207,201 B2
(45) Date of Patent: *Feb. 19, 2019

(54) PHASE SEPARATION PROCESS BY INVERSION OF THE DIRECTION OF DISPERSION

(71) Applicant: BASF SE, Ludwigshafen (DE)

(72) Inventors: Daniel Pfeiffer, Neustadt (DE); Stefan Bitterlich, Dirmstein (DE)

(73) Assignee: BASF SE, Ludwigshafen am Rhein (DE)

(*) Notice: Subject to any disclaimer, the term of this patent is extended or adjusted under 35 U.S.C. 154(b) by 831 days.

This patent is subject to a terminal disclaimer.

(21) Appl. No.: 13/937,428

(22) Filed: Jul. 9, 2013

(65) Prior Publication Data

US 2014/0014596 A1   Jan. 16, 2014

Related U.S. Application Data

(60) Provisional application No. 61/670,131, filed on Jul. 11, 2012.

(51) Int. Cl.
  *B01D 17/02* (2006.01)

(52) U.S. Cl.
  CPC ......... *B01D 17/02* (2013.01); *B01D 17/0214* (2013.01)

(58) Field of Classification Search
  None
  See application file for complete search history.

(56) References Cited

U.S. PATENT DOCUMENTS

| 3,271,467 | A | 9/1966 | Nakayama |
| 3,406,217 | A | 10/1968 | Davison et al. |
| 6,503,465 | B1 | 1/2003 | Lin et al. |
| 9,095,789 | B2* | 8/2015 | Pfeiffer ............... B01D 17/045 |
| 9,409,839 | B2* | 8/2016 | Pfeiffer ............... C07C 7/144 |
| 2003/0109767 | A1 | 6/2003 | Vasina et al. |
| 2011/0137097 | A1 | 6/2011 | Tschirschwitz et al. |
| 2011/0137098 | A1 | 6/2011 | Tschirschwitz et al. |
| 2011/0155632 | A1 | 6/2011 | Timken et al. |
| 2011/0155640 | A1 | 6/2011 | Timken et al. |
| 2014/0014596 | A1* | 1/2014 | Pfeiffer ............... B01D 17/02 |
|  |  |  | 210/805 |
| 2014/0018596 | A1* | 1/2014 | Pfeiffer ............... C07C 7/144 |
|  |  |  | 585/803 |

(Continued)

FOREIGN PATENT DOCUMENTS

| EP | 1503236 A1 | 2/2005 |
| WO | WO-2010062922 A2 | 6/2010 |
| WO | WO-2010074836 A2 | 7/2010 |

(Continued)

OTHER PUBLICATIONS

U.S. Appl. No. 61/438,686, filed Feb. 2, 2011.

(Continued)

*Primary Examiner* — Robert J Popovics
(74) *Attorney, Agent, or Firm* — Drinkler Biddle & Reath LLP

(57) ABSTRACT

The present invention relates to a process for separating a phase (A) from a phase (B), phase (A) having a higher viscosity than phase (B), by inverting the direction of dispersion from phase (B) in phase (A) to phase (A) in phase (B) by recycling a stream comprising phase (B) in excess.

20 Claims, 2 Drawing Sheets

(56) References Cited

U.S. PATENT DOCUMENTS

2014/0018598 A1\* 1/2014 Pfeiffer ................ B01D 17/045
585/818

FOREIGN PATENT DOCUMENTS

| WO | WO-2010075038 A2 | 7/2010 |
|---|---|---|
| WO | WO-2011069929 A1 | 6/2011 |
| WO | WO-2011069957 A1 | 6/2011 |
| WO | WO-2012104769 A1 | 8/2012 |

OTHER PUBLICATIONS

U.S. Appl. No. 61/670,130, filed Jul. 11, 2012.
U.S. Appl. No. 61/670,132, filed Jul. 11, 2012.
U.S. Appl. No. 61/670,133, filed Jul. 11, 2012.
U.S. Appl. No. 61/670,134, filed Jul. 11, 2012.
U.S. Appl. No. 61/670,135, filed Jul. 11, 2012.
U.S. Appl. No. 61/670,136, filed Jul. 11, 2012.
U.S. Appl. No. 61/670,140, filed Jul. 11, 2012.
U.S. Appl. No. 61/670,142, filed Jul. 11, 2012.

\* cited by examiner

PHASE SEPARATION PROCESS BY INVERSION OF THE DIRECTION OF DISPERSION

This patent application claims the benefit of pending U.S. provisional patent application Ser. No. 61/670,131 filed on Jul. 11, 2012, incorporated in its entirety herein by reference.

The present invention relates to a process for removing a phase (A) from a phase (B), phase (A) having a higher viscosity than phase (B), by inverting the direction of dispersion from phase (B) in phase (A) to phase (A) in phase (B) by recycling a stream comprising phase (B) in excess.

The separation or removal of two or polyphasic mixtures, especially when these mixtures are in the form of dispersions, is a general problem in chemical processes. A situation which frequently occurs in this context is the removal of an ionic liquid (phase having a higher viscosity) from hydrocarbons (phase having a low viscosity).

Ionic liquids are suitable, inter alia, as catalysts for the isomerization of hydrocarbons. A corresponding use of an ionic liquid is disclosed, for example, in WO 2011/069929, where a specific selection of ionic liquids is used in the presence of an olefin for isomerization of saturated hydrocarbons, more particularly for isomerization of methylcyclopentane (MCP) to cyclohexane.

In general, ionic liquids on the one hand and hydrocarbons (or organic phases in general) on the other hand are immiscible or only of very limited miscibility; they form two separate phases. In order to be able to utilize this catalytic action, intensive contact has to be established between organic phase and the ionic liquid. For this purpose, the two phases are frequently mixed in stirred tanks with vigorous stirring to obtain dispersions. Depending on parameters such as the nature of the ionic liquid or of the organic phase or the phase ratio, the dispersion may either be in the form of a dispersion of an ionic liquid in the organic phase or may be a dispersion of the organic phase in the ionic liquid. In this context, it is frequently desirable to separate the phases again after a reaction/catalysis.

For separation of bi- or polyphasic mixtures, especially of dispersions, the use of coalescing filters has long been known. For example, international application PCT/IB2012/050417 (filed Jan. 30, 2012) discloses a process for reducing the water content in pyrolysis gasoline using a coalescing filter manufactured from metal and/or glass fibers. A coalescing filter, however, can be used not just for water removal from mixtures (dispersions) having an organic phase (pyrolysis gasoline), but also for removal of ionic liquids from dispersions comprising an organic phase.

WO 2010/062922 discloses a multistage process for separating an ionic liquid from hydrocarbons using a coalescing filter. The characteristics of the coalescing filter material must be such that it has a stronger affinity for the ionic liquid relative to the hydrocarbons. Suitable coalescing filter materials according to WO 2010/062922 are glass beads, stainless steel, glass fibers, polymer fibers or organic membranes, especially glass fibers. In the coalescing filter, separation of the ionic liquid from the hydrocarbons is accomplished.

US-A 2011/0155632 discloses a process for preparing products with a low hydrogen halide content, wherein the content of hydrogen halides is reduced in at least two separation stages, by stripping or distillation from a mixture which originates from a reactor and comprises an ionic liquid as a catalyst. In one embodiment of the process described in US-A 2011/0155632, the ionic liquid used as a catalyst is recycled into an alkylation reactor from a downstream phase separator, and hydrogen chloride is recycled from a first distillation column downstream of the phase separator and an isobutane-comprising stream from a second distillation column further downstream into the alkylation reactor. US-A 2011/0155632, however, does not disclose anywhere whether the reaction mixtures present in the respective reactor in which, for example, an alkylation or isomerization is being performed, or the reaction mixtures drawn off therefrom, are present as dispersions or which direction of dispersion, if any, would be present. Moreover, there is also no clue in this document that the recycling of a phase component can invert the direction of dispersion of such a dispersion. A similar disclosure to that in US-A 2011/0155632 is present in US-A 2011/0155640, but the process described therein relates to a hydrocarbon conversion.

It is an object of the present invention to provide a novel process for removing a phase having a higher viscosity, especially an ionic liquid, from a phase having a lower viscosity, especially a hydrocarbonaceous organic phase, the phase having higher viscosity being dispersed in the phase having lower viscosity.

The object is achieved by a process for separating a phase (A) from a phase (B), phase (A) having a higher viscosity than phase (B), comprising the following steps:

a) providing a stream (S1) comprising a dispersion (D1) in which phase (B) is dispersed in phase (A),
b) introducing a stream (S2) comprising at least 70% by weight, preferably at least 90% by weight, of phase (B), into stream (S1), stream (S2) being recycled from step f),
c) to form a stream (S3) comprising a dispersion (D2) in which phase (A) is dispersed in phase (B),
d) introducing stream (S3) into a phase separation unit,
e) separating stream (S3) in the phase separation unit into a stream (S5) comprising at least 70% by weight, preferably at least 90% by weight, of phase (B), and into a stream (S4) comprising at least 70% by weight, preferably at least 90% by weight, of phase (A),
f) removing a portion of stream (S5) as stream (S2) and recycling stream (S2) to step b).

The process according to the invention can advantageously achieve effective separation of a higher-viscosity phase, especially of ionic liquids, from a low-viscosity phase, especially a hydrocarbonaceous organic phase, by performing an inversion of the direction of dispersion in the dispersion comprising the two phases. According to the invention, the effect of the inversion of the direction of dispersion is that the direction of dispersion is altered from "low-viscosity phase in higher-viscosity phase" to "higher-viscosity phase in low-viscosity phase". The expression "inversion of the direction of dispersion" is defined in detail in the text which follows in connection with step c) of the process according to the invention.

Alkylations or isomerizations of hydrocarbons (organic phases) can be performed in the presence of ionic liquids, in which case the ionic liquids generally have a higher viscosity than the organic phases. These reactions generally proceed with a direction of dispersion of "low-viscosity phase in higher-viscosity phase". The removal (phase separation) of greater amounts of such higher-viscosity components, in contrast, proceeds relatively slowly; therefore, greater apparatus complexity is required compared to the process according to the invention. As a result of the inventive inversion of the direction of dispersion, the phase separation proceeds much more rapidly; as a result, lower apparatus complexity is required. Thus, with the process according to the invention, in cases in which the phase separation is connected downstream of a reaction step conducted in a biphasic mixture (for example an isomerization) (even when, for reaction-related reasons, a high phase ratio of higher-viscosity phase/low-viscosity phase is established), a rapid phase separation can be achieved and hence the apparatus complexity for this step can be kept low. This is the case, for example, in hydrocarbon conversions in the presence of catalytically active ionic liquids, especially isomerizations, where the ionic liquid or a mixture of a plurality of ionic liquids constitutes the higher-viscosity phase.

If, in the context of the present invention, after the inversion of the direction of dispersion and the associated removal step in a phase separation unit, preferably in a phase separator, a further separation step is performed using a coalescing filter, for example a coalescing filter made from acrylic/phenolic resin, or using a downstream separator, improved removal of higher-viscosity components, especially ionic liquids, present in fine dispersion and/or in small amounts, is additionally achieved.

Figure 1:
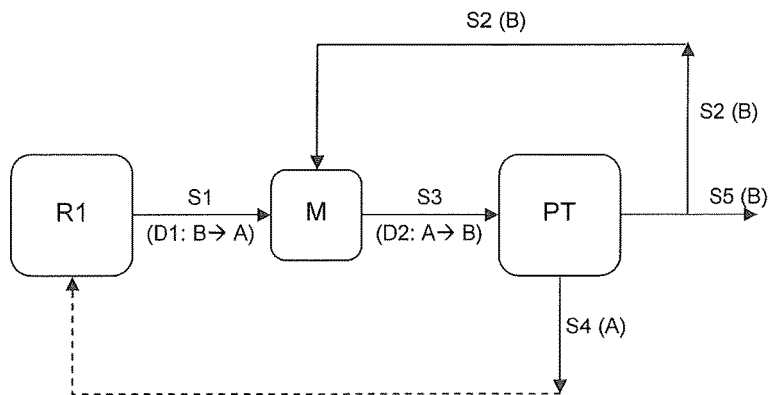
FIG. 1 illustrates the process according to the invention in a preferred embodiment.

The process according to the invention for removal of a phase (A) from a phase (B) by recycling of a stream comprising phase (B) in excess and the associated inversion of the direction of dispersion is defined in detail hereinafter.

In the context of the present invention, a first characteristic of phase (A) is that it has a higher viscosity than phase (B). Phase (A) may thus comprise any desired compounds, provided that the biphasicity mentioned exists and the viscosity of phase (A), as a result of the compounds present therein, is higher (greater) than the viscosity of phase (B), which is in turn fixed by the compounds present in phase (B). For example, phase (A) comprises ionic liquids which fix the viscosity of phase (A) or—if further compounds miscible with ionic liquids are present in phase (A)—crucially influence the viscosity of phase (A).

The viscosity of phase (A) is preferably at least 0.1 mPas and especially at least 20 mPas higher than that of phase (B).

Phase (A) preferably comprises at least one ionic liquid. For example, phase (A) may comprise mixtures of two or more ionic liquids; phase (A) preferably comprises one ionic liquid. As well as the ionic liquid, phase (A) may also comprise further components miscible with the ionic liquid. Such components may, for example, be cocatalysts which are used in isomerization reactions using ionic liquids. A preferred example of such cocatalysts is hydrogen halides, especially hydrogen chloride. In addition, phase (A) may also comprise constituents of phase (B) or decomposition products of the ionic liquids which can form, for example, during the isomerization process, such as aluminum chloride. Preferably, in phase (A), the proportion of ionic liquid is greater than 80% by weight (based on the sum of all components of phase (A)).

Suitable ionic liquids in the context of the present invention are in principle all ionic liquids known to those skilled in the art. An overview with regard to suitable ionic liquids can be found, for example, in WO 2011/069929. In the context of the present invention, preference is given to an acidic ionic liquid. The ionic liquid present in phase (A) is preferably an ionic liquid, especially an acidic ionic liquid, having the composition $K1Al_nX_{(3n+1)}$ where K1 is a monovalent cation, X is halogen and $1<n<2.5$. K1 is preferably an unsubstituted or at least partly alkylated ammonium ion or a heterocyclic (monovalent) cation, especially a pyridinium ion, an imidazolium ion, a pyridazinium ion, a pyrazolium ion, an imidazolinium ion, a thiazolium ion, a triazolium ion, a pyrrolidinium ion, an imidazolidinium ion or a phosphonium ion. X is preferably chlorine or bromine.

The ionic liquid, especially the acidic ionic liquid, more preferably comprises, as a cation, an at least partly alkylated ammonium ion or a heterocyclic cation and/or, as an anion, a chloroaluminate ion having the composition $Al_nCl_{(3n+1)}$ where $1<n<2.5$. The at least partly alkylated ammonium ion preferably comprises one, two or three alkyl radicals (each) having 1 to 10 carbon atoms. If two or three alkyl substituents are present with the corresponding ammonium ions, the respective chain length can be selected independently; preferably, all alkyl substituents have the same chain length. Particular preference is given to trialkylated ammonium ions having a chain length of 1 to 3 carbon atoms. The heterocyclic cation is preferably an imidazolium ion or a pyridinium ion.

The ionic liquid, especially the acidic ionic liquid, especially preferably comprises, as a cation, an at least partly alkylated ammonium ion and, as an anion, a chloroaluminate ion having the composition $Al_nCl_{(3n+1)}$ where $1<n<2.5$. Examples of such particularly preferred ionic liquids are trimethylammonium chloroaluminate and triethylammonium chloroaluminate.

In the context of the present invention, a first characteristic of phase (B) is that it has a lower viscosity than phase (A). For example, phase (B) may be an organic phase. Phase (B) is preferably an organic phase which is immiscible or has only very low miscibility with ionic liquids and/or which comprises not more than 1% by weight of ionic liquids (based on the total weight of the phase) (excluding any extraneous phase dispersed therein). It is additionally preferred that phase (B) comprises at least one hydrocarbon. Phase (B) more preferably comprises, as the hydrocarbon, cyclohexane or a mixture of cyclohexane with at least one further hydrocarbon selected from methylcyclopentane (MCP), n-hexane, isohexane, n-heptane, isoheptane or dimethylcyclopentane. Phase (B) especially preferably comprises a mixture of cyclohexane, MCP and at least one further hydrocarbon.

In the context of the present invention, in step a), a stream (S1) comprising a dispersion (D1) in which phase (B) is dispersed in phase (A) is provided. The direction of dispersion (i.e. the information as to which phase is in disperse form in the respective other phase) can be determined by examining a sample, optionally after addition of a dye which selectively stains one phase, under a transmitted light microscope. The presence of a dispersion as such can be recognized by the turbidity of the corresponding vessel contents.

Dispersion (D1) can be produced by methods known to those skilled in the art; for example, such a dispersion can be obtained by vigorous stirring of the components present in the respective phases. Such an operation can take place, for example, in the course of an isomerization process of hydrocarbon using an ionic liquid. In the dispersion (D1), phases (A) and (B) may be present in any desired ratios relative to one another, provided that phase (B) is dispersed in phase (A).

Preferably, phase (B) is present in stream (S1) in dispersion (D1) to a maximum extent of 25% by weight, more preferably to a maximum extent of 20% by weight, especially to a maximum extent of 10% by weight (based in each case on the amount of phase (A)).

According to step b) of the invention, a stream (S2) comprising at least 70% by weight, preferably at least 90% by weight, especially at least 99% by weight, of phase (B) is introduced into stream (S1), stream (S2) being recycled from step f). The above figures in % by weight are based on the total amount of stream (S2).

In step c), a stream (S3) comprising a dispersion (D2) in which phase (A) is dispersed in phase (B) is formed. The recycling of a portion of stream (S5) as stream (S2) and the associated introduction of stream (S2) into stream (S1) achieves inversion of the direction of dispersion in stream (S1). Inversion of the direction of dispersion means that (S1) at first comprises a dispersion (D1) in which phase (B) is dispersed in phase (A). The amount of stream (S2) in step b) is selected such that a stream (S3) comprising dispersion (D2) is formed, in which phase (A) is dispersed in phase (B). In the context of the present invention, step c) is preferably the direct consequence of the performance of step b). This means that steps b) and c) of the invention are preferably not performed with spatial separation; instead, the performance of step b) directly brings about the formation of dispersion (D2) according to step c). Preferably, in step b), stream (S2) is introduced into stream (S1) in a stirred vessel or static mixer in which stream (S3) is formed according to step c). Optionally, however, it is also possible that steps b) and c) of the invention are performed with spatial separation. In all embodiments, it is also conceivable that, in step (b), one or more streams comprising an excess of phase (A) or of phase (B) are introduced, in order thus to control the establishment of dispersion (D2).

According to step d), in the process according to the invention, stream (S3) is introduced into a phase separation unit. Phase separation units as such are known to those skilled in the art. This phase separation unit is preferably a phase separator.

In step e), stream (S3) is separated in the phase separation unit into a stream (S5) comprising at least 70% by weight, preferably at least 90% by weight, especially preferably at least 99% by weight, of phase (B), and into a stream (S4) comprising at least 70% by weight, preferably at least 90% by weight, especially preferably at least 99% by weight, of phase (A). The above figures in % by weight are based on the corresponding amounts present in stream (S3).

In step f), a portion of stream (S5) is removed as stream (S2) and stream (S2) is recycled to step b). For example, stream (S2) is removed from stream (S5) outside the phase separation unit. In general, between 50 and 90% of the total amount of stream (S5) is removed as stream (S2) and recycled into stream (S1). However, it is also conceivable that, at least temporarily, larger amounts or stream (S5) are even recycled completely.

It is additionally preferable that the phase ratio of phase (A) to phase (B) in dispersion (D2) present in stream (S3) is ≤3 [kg/kg], more preferably ≤0.9 [kg/kg]. In an alternative embodiment of the present invention, it is preferable that the phase ratio of phase (A) to phase (B) in dispersion (D2) present in stream (S3) is <2.5 [kg/kg], stream (S3) being formed in a stirring apparatus by introducing stream (S2) into stream (S1).

It is additionally preferred that stream (S1) is obtained from a reaction in the presence of an ionic liquid (as a catalyst), preferably an isomerization, especially an isomerization of methylcyclopentane (MCP) to cyclohexane. The reaction is preferably performed in a stirred vessel or a cascade of stirred vessels.

It is additionally preferred that the stream (S5) obtained (from the phase separation unit) according to step e) comprises not more than 10% by weight of phase (A). Especially preferably, only small amounts of phase (A), if any, are present in stream (S5) (<1% by weight). It is additionally preferred that the stream (S4) obtained (from the phase separation unit) according to step e) comprises not more than 15% by weight of phase (B) and/or stream (S4) is recycled into an isomerization. The above figures in % by weight are based on the total amounts of stream (S5) or stream (S4).

FIG. 1 once again illustrates the process according to the invention as per the above-described steps a) to f). For better understanding, FIG. 1 states the main components present in each of the streams in brackets below each of them. For streams (S1) and (S3), the respective expression in brackets also includes the direction of dispersion of the respective dispersions, the arrow expressing the direction of dispersion. This means that, for example, dispersion (D1) present in stream (S1) has a phase (B) dispersed in phase (A). In FIG. 1, stream (S2) is introduced into stream (S1) in a mixing apparatus (M). The broken line indicates that stream (S4) can optionally also be recycled into the reaction apparatus or a cascade of reaction apparatuses (R1) in which an isomerization in the presence of an ionic liquid can be performed. PT in FIG. 1 means phase separation unit.

In a preferred embodiment of the present invention, stream (S5) which is obtained in the phase separation unit according to step e) is used to perform (at least) one further phase separation step. This further phase separation step is preferably performed in order to remove residual amounts of phase (A) present in stream (S5). Especially preferably, after performance of this further phase separation step, only a small amount of phase (A), if any, is present in stream (S5) (<50 ppm by weight). This further phase separation step may directly follow the performance of step e) or may follow the removal of stream (S2) according to step f). This further phase separation step preferably follows the removal of stream (S2) according to step f).

Apparatuses for performance of this further phase separation step are known to those skilled in the art. For this purpose, preference is given to using apparatuses suitable for removing residual amounts or smaller amounts (<2.5% by weight based on the total amount to be separated). Preferred apparatuses are coalescing filters or other downstream separators. Downstream separators are phase separators with or without internals, downstream of a first phase separation unit. Possible internals are knits, random packings, structured packings or tubes.

This is preferably performed in such a way that removal of stream (S2) is followed by passing stream (S5) through a coalescing filter and/or another downstream separator in order to remove residual amounts of phase (A) remaining in stream (S5). Especially preferably, after performance of this further phase separation step, only a small amount of phase (A), if any, is present in stream (S5) (<50 ppm by weight).

If a coalescing filter is used, this is preferably a coalescing filter made from glass fiber or acrylic/phenolic resin, especially of acrylic/phenolic resin. Coalescing filters made from acrylic/phenolic resin are commercially available, for example, from Fuhr GmbH (Germany) or from the manufacturer CUNO Fluid Purification. Such suitable coalescing filters (K) have finenesses of 1-150 μm, preferably 10, 25 or 50 μm, especially preferably 10 μm. In addition, 2 versions are possible with respect to the surface: grooved and ungrooved; ungrooved is preferred. The cartridges of the coalescing filter (K) as such preferably have an internal diameter of 27 mm and an external diameter of 65 mm and are available in lengths of 4" to 60". The cartridge is preferably an asymmetric, resin-bonded filter cartridge with no support core. It preferably comprises essentially acrylic fibers bonded with phenolic resin.

The coalescing filter can be integrated into a larger unit, for example a filter vessel. In the context of the present invention, a coalescing filter manufactured from glass fiber or acrylic/phenolic resin is preferably understood to mean the filter material as such. The other components of the filter unit, for example the vessel of the unit (filter vessel) or the filter module into which the filter material has been introduced may be manufactured from materials other than glass fiber and/or acrylic/phenolic resin. The expression "manufactured from" in the context of the present invention means that the material used for production of the filter material comprises glass fiber or acrylic/phenolic resin. The filter material preferably comprises at least 50% by weight, more preferably at least 75% by weight and especially at least 95% by weight of glass fiber or acrylic/phenolic resin.

If a downstream separator (also referred to as downstream phase separator) other than a coalescing filter is used, the downstream separator used preferably comprises a knit, especially a glass fiber knit. Suitable knits, especially glass fiber knits, are known to those skilled in the art; they are commercially available, for example, from Rhodius (Germany). The preferred glass fiber knits are glass staple fibers having a fiber diameter between 0.1 and 0.6 mm, preferably between 0.14 and 0.3 mm. The knit comprises essentially wound (glass staple) fiber mats having a packing density between 100 and 800 kg/m$^3$, preferably 150 to 500 kg/m$^3$, more preferably 200 to 400 kg/m$^3$.

Optionally, the amount of phase (A) removed from the apparatus for performance of the further phase separation step can be recycled into the process according to the invention. Preference is given to recycling such a stream into the reaction apparatus or the cascade of reaction apparatuses in which an isomerization can be performed in the presence of an ionic liquid. This recycle stream is preferably combined with stream (S4) which is obtained in step e) of the process according to the invention. Optionally, these streams comprising phase (A) can also be recycled to another point in the process according to the invention, for example into a mixing or stirring apparatus, in order to control the concentration of phase (A) in dispersion (D2).

It is also possible that, after the residual amount of phase (A) has been removed from stream (S5) in the apparatus for performance of the further phase separation step, a further portion is removed, and this is optionally combined with stream (S2) and recycled to step b).

Figure 2:
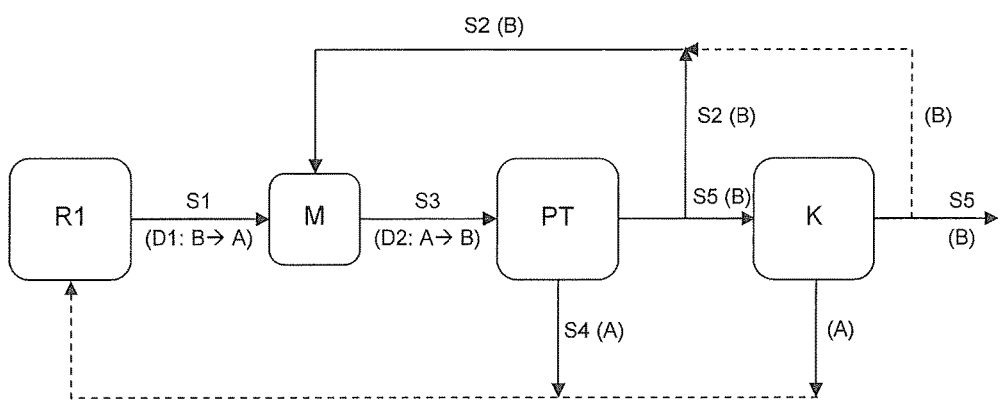
FIG. 2 illustrates the process according to the invention in a preferred embodiment.

FIG. 2 once again illustrates the process according to the invention (in a configuration) of the preferred embodiment described above. In FIG. 2, the abbreviations, arrows and broken lines have a similar meaning to that explained above for FIG. 1; K means coalescing apparatus comprising a coalescing filter.

In the context of the present invention, cyclohexane is preferably isolated from stream (S5). Processes and apparatuses for removal of cyclohexane from stream (S5), especially when it is a hydrocarbon mixture, are known to those skilled in the art. Optionally, prior to the removal of the cyclohexane, further purification steps (for example a wash with an aqueous and/or alkaline phase) can be conducted, these being known to those skilled in the art.

The invention is illustrated hereinafter by means of examples.

EXAMPLES

Figure 3:
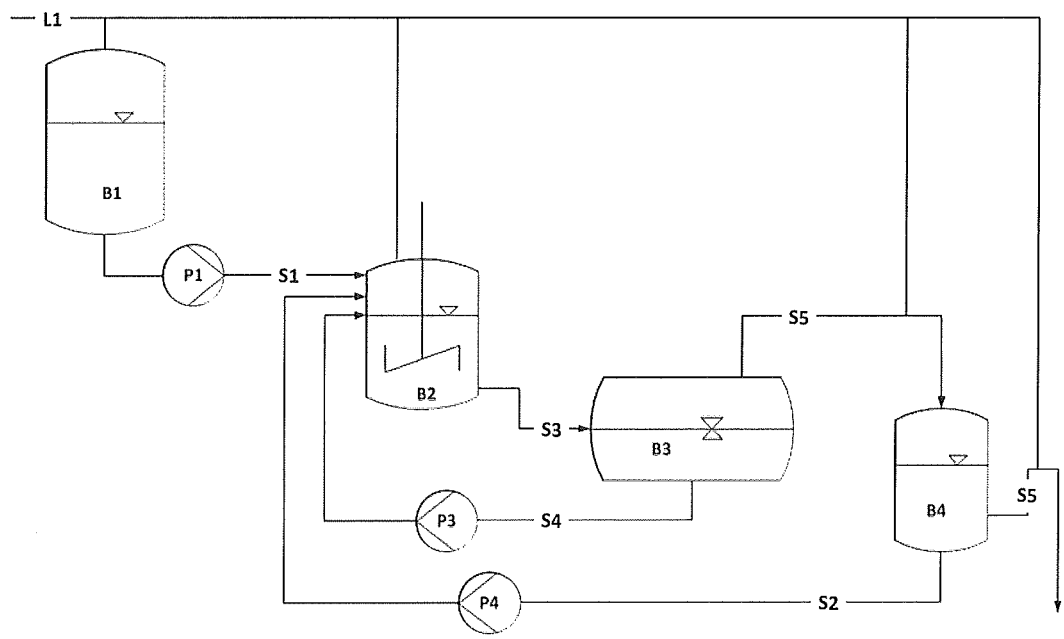
FIG. 3 illustrates the experimental arrangement.

For the experiment, the following substances are used:
Phase (A)
  ionic liquid (IL) having the composition $(CH_3)_3NH$ $Al_nCl_{3n+1}$ where n=1.82 according to elemental analysis (also referred to as IL phase).
Phase (B)
  hydrocarbon mixture having the composition (also referred to as organic phase):
  methylcyclopentane 20% by weight
  cyclohexane 50% by weight
  hexane 28%
  isohexanes (technical mixture) 2% by weight The experimental arrangement is shown in the figure according to FIG. 3:

Vessel (B1) is initially charged with phase (B). B1 is (like B2 and B3 too, and the overflows from B4 and B5) connected to a nitrogen-conducting gas line (L1) which is kept at atmospheric pressure.

By means of the metering pump P1, phase (B) is conducted as stream (S0) into the stirred vessel B2. This is a 2 l glass stirred vessel (internal diameter: 100 mm) with a 6-blade pitched-blade stirrer, diameter 60 mm. B2 is operated with a capacity of 1.0 liter. In B2, by stirring at a speed of 1400 min$^{-1}$, a dispersion of the two phases is produced, with dispersion of phase (A), and this is conducted as stream (S1) into the stirred vessel B3 of identical design to B2.

The speed of the stirrer in B3 is varied during the experiment; see table 1.

In B3, (S1) is combined with stream (S2), which is drawn off from vessel B5 (pump reservoir) by means of the flow-regulated metering pump P5 in a varying amount in the course of the experiment (see table 1). In B3, a dispersion is formed, in which phase (A) is dispersed in phase (B). From B3, stream (S3) is conducted into phase separator B4 (glass, horizontal, internal dimensions: diameter 50 mm, length 500 mm). In this apparatus, which is operated in flooded mode, there is separation of the IL phase (lower phase) from the hydrocarbon phase (upper phase). The lower phase is recycled as stream (S4) by means of the metering pump P4 to B2 at a constant pumping rate of 1.5 kg/h.

The upper phase from B4 is conducted as stream (S5) over an overflow, which determines the liquid level in B2 and B3, into the reservoir B5. In some experimental settings, the recycle stream (S2) is pumped from B5 to B2; the stream (S6) remaining after stream (S2) has been drawn off is conducted via an overflow, which determines the liquid level in B5, into a collecting vessel.

All vessels are equipped with a jacket and are kept at 40° C. by means of a heat carrier oil circulated through a laboratory thermostat during the experiments described below.

The phase separation characteristics are examined in two ways for each experimental setting:
1. observation of the phase separator (checking for presence of a dispersion layer and optional estimation of the length thereof),
2. stopping the stirrer in B3 after interruption of the feed streams (switching off the pumps) and measurement of the phase separation time.

The results are shown in table 1 below:

| | Flow rates [kg/h] | | | Phase ratio | Stirrer | Dispersion | |
|---|---|---|---|---|---|---|---|
| Setting No. | Stream S0 | Stream S4 | Stream S2 | (A)/(B) in B3* [kg/kg] | speed B3 [1/min] | layer in B4 [cm] | Time for phase separation [min] |
| 1 (comp.) | 0.5 | 1.5 | 0 | 3 | 1400 | 7 | approx. 4 |
| 2 | 0.5 | 1.5 | 0.25 | 2 | 1400 | <0.1 | 0.2 |

-continued

| | Flow rates [kg/h] | | | Phase ratio | Stirrer | Dispersion | |
|---|---|---|---|---|---|---|---|
| Setting No. | Stream S0 | Stream S4 | Stream S2 | (A)/(B) in B3* [kg/kg] | speed B3 [1/min] | layer in B4 [cm] | Time for phase separation [min] |
| 3 | 0.5 | 1.5 | 0.44 | 1.6 | 1400 | <0.1 | 0.2 |
| 4 | 0.5 | 1.5 | 0.75 | 1.2 | 1200 | <0.1 | 0.2 |
| 5 | 0.5 | 1.5 | 1.17 | 0.9 | 1030 | <0.1 | 0.2 |

In contrast to comparative example 1, the direction of dispersion has been inverted in working examples 2 to 5. In the phase separator (B4), this can also be identified by the almost complete disappearance of the dispersion layer. The length of the dispersion layer is a measure of the time which is required for the phase breakup. The results also show that it is possible, by recycling of organic phase via stream (S2), to induce inversion of the direction of dispersion and thus to bring about a considerable acceleration of the phase separation.

The invention claimed is:

1. A process for separating a phase (A) from a phase (B), phase (A) having a higher viscosity than phase (B), wherein phase (A) comprises at least one ionic liquid and phase (B) comprises at least one hydrocarbon, comprising the following steps:
   a) providing a stream (S1) comprising a dispersion (D1) in which phase (B) is dispersed in phase (A),
   b) introducing a stream (S2) comprising at least 70% by weight of phase (B), into stream (S1), stream (S2) being recycled from step f),
   c) to form a stream (S3) comprising a dispersion (D2) in which phase (A) is dispersed in phase (B),
   d) introducing stream (S3) into a phase separator,
   e) separating stream (S3) in the phase separator into a stream (S5) comprising at least 70% by weight of phase (B), and into a stream (S4) comprising at least 70% by weight of phase (A),
   f) removing a portion of stream (S5) as stream (S2) and recycling stream (S2) to step b).

2. The process according to claim 1, wherein in step b) the stream (S2) comprises at least 90% by weight of phase (B) or in step e) the stream (S5) comprises at least 90% by weight of phase (B) or in step e) the stream (S4) comprises at least 90% by weight of phase (A).

3. The process according to claim 1, wherein the viscosity of phase (A) is at least 0.1 mPas higher than that of phase (B).

4. The process according to claim 1, wherein the ionic liquid present in phase (A) comprises, as a cation, an at least partly alkylated ammonium ion or a heterocyclic cation or, as an anion, a chloroaluminate ion having the composition $AlCl_{(3n+1)}$ where $1<n<2.5$.

5. The process according to claim 1, wherein phase (B) comprises, as the hydrocarbon, cyclohexane or a mixture of cyclohexane with at least one further hydrocarbon selected from methylcyclopentane (MCP), n-hexane, isohexane, n-heptane, isoheptane or dimethylcyclopentane.

6. The process according to claim 1, wherein, in step b), stream (S2) is introduced into stream (S1) in a stirred vessel or static mixer in which stream (S3) according to step c) is formed.

7. The process according to claim 1, wherein the phase ratio of phase (A) to phase (B) in dispersion (D2) present in stream (S3) is ≤3 kg/kg.

8. The process according to claim 7, wherein the phase ratio is ≤0.9 kg/kg.

9. The process according to claim 1, wherein the phase ratio of phase (A) to phase (B) in dispersion (D2) present in stream (S3) is <2.5 kg/kg, stream (S3) being formed in a stirring apparatus by introducing stream (S2) into stream (S1).

10. The process according to claim 1, wherein stream (S1) is obtained from an isomerisation.

11. The process according to claim 10, wherein the isomerisation is an isomerization of methylcyclopentane (MCP) to cyclohexane in the presence of an ionic liquid.

12. The process according to claim 1, wherein stream (S5) obtained according to step e) comprises not more than 10% by weight of phase (A) (based on the amount present in (S3)).

13. The process according to claim 1, wherein stream (S4) obtained from the phase separator according to step e) comprises not more than 15% by weight of phase (B) (based on the amount present in (S3)) or stream (S4) is recycled into an isomerization.

14. The process according to claim 1, wherein the phase ratio of phase (A) to phase (B) in dispersion (D1) present in stream (S1) is >3 kg/kg.

15. The process according to claim 14, wherein the phase ratio is >4 kg/kg.

16. The process according to claim 1 wherein removal of stream (S2) is followed by passing stream (S5) through a coalescing filter or a downstream separator in order to remove residual amounts of phase (A) remaining in stream (S5).

17. The process according to claim 16, wherein a coalescing filter is used, or the downstream separator comprises a knit.

18. The process according to claim 17, wherein the coalescing filter is made from glass fiber or acrylic/phenolic resin or the knit is a glass fiber knit.

19. The process according to claim 1, wherein cyclohexane is isolated from stream (S5).

20. A process for separating a phase (A) from a phase (B), phase (A) having a higher viscosity than phase (B), wherein phase (A) comprises at least one ionic liquid and phase (B) comprises at least one hydrocarbon, comprising the following steps:
   a) providing a stream (S1) comprising a dispersion (D1) in which phase (B) is dispersed in phase (A),
   b) introducing a stream (S2) comprising at least 70% by weight of phase (B), into stream (S1), stream (S2) being recycled from step f),
   c) to form a stream (S3) comprising a dispersion (D2) in which phase (A) is dispersed in phase (B),
   d) introducing stream (S3) into a horizontal, glass phase separator, which is operated in flooded mode resulting,
   e) separating stream (S3) in the phase separator based on viscosity difference in the phases into a stream (S5)

comprising at least 70% by weight of phase (B), and into a stream (S4) comprising at least 70% by weight of phase (A), f) removing a portion of stream (S5) as stream (S2) and recycling stream (S2) to step b).

\* \* \* \* \*